US012602038B2

(12) United States Patent
Jin

(10) Patent No.: US 12,602,038 B2
(45) Date of Patent: Apr. 14, 2026

(54) LOGGING SUPPORT APPARATUS, LOGGING SYSTEM, METHOD FOR LOGGING SUPPORT, AND RECORDING MEDIUM

(71) Applicant: Mitsubishi Electric Corporation, Tokyo (JP)

(72) Inventor: Jijun Jin, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 395 days.

(21) Appl. No.: 18/266,607

(22) PCT Filed: Jan. 21, 2021

(86) PCT No.: PCT/JP2021/002070
§ 371 (c)(1),
(2) Date: Jun. 12, 2023

(87) PCT Pub. No.: WO2022/157891
PCT Pub. Date: Jul. 28, 2022

(65) Prior Publication Data
US 2024/0045416 A1     Feb. 8, 2024

(51) Int. Cl.
*G05B 23/02* (2006.01)
*G05B 19/05* (2006.01)
(Continued)

(52) U.S. Cl.
CPC ......... *G05B 23/0264* (2013.01); *G05B 19/05* (2013.01)

(58) Field of Classification Search
CPC .. G05B 23/0264; G05B 19/05; G05B 19/418; G05B 19/058; H04L 41/22; G06F 11/30; Y02P 90/02
See application file for complete search history.

(56) References Cited

U.S. PATENT DOCUMENTS

| | | | | |
|---|---|---|---|---|
| 6,198,480 | B1 * | 3/2001 | Cotugno | G05B 19/0426 |
| | | | | 715/866 |
| 10,387,392 | B2 * | 8/2019 | Bliss | G06F 16/185 |

(Continued)

FOREIGN PATENT DOCUMENTS

| | | |
|---|---|---|
| JP | 2004-234436 A | 8/2004 |
| JP | 2005-092806 A | 4/2005 |

(Continued)

OTHER PUBLICATIONS

International Search Report and Written Opinion mailed on Apr. 6, 2021, received for PCT Application PCT/JP2021/002070, filed on Jan. 21, 2021, 8 pages including English Translation.

(Continued)

*Primary Examiner* — Glenford J Madamba
*Assistant Examiner* — Hassan Abdur-Rahman Khan
(74) *Attorney, Agent, or Firm* — XSENSUS LLP

(57) ABSTRACT

A logging support apparatus (10) includes a device enumerator (101) to analyze a project file (D121) for a control system including a PLC (20) and enumerate at least one device related to the control system, a display controller (102) to cause a list of the at least one device enumerated by the device enumerator (101) to be displayed on a display (130), and a device designator (105) to designate a device to be included into a logging target among the at least one device displayed on the display (130) in accordance with an operation of a user, and generate target data (D122) indicating the device designated to be included into the logging target.

18 Claims, 8 Drawing Sheets

(51) Int. Cl.
    G05B 19/418      (2006.01)
    G06F 11/30       (2006.01)
    H04L 41/22       (2022.01)

(56)                References Cited

U.S. PATENT DOCUMENTS

| | | | | |
|---|---|---|---|---|
| 2010/0228725 | A1* | 9/2010 | Ohashi | G05B 23/0216 |
| | | | | 707/E17.014 |
| 2014/0304253 | A1* | 10/2014 | Hanaki | G05B 23/0272 |
| | | | | 707/722 |
| 2014/0366118 | A1* | 12/2014 | Yin | G06F 11/1471 |
| | | | | 726/12 |
| 2015/0378773 | A1* | 12/2015 | Nagata | G06F 9/46 |
| | | | | 718/100 |
| 2017/0337226 | A1* | 11/2017 | Bliss | H04L 67/1097 |
| 2018/0052683 | A1* | 2/2018 | Iguchi | G05B 19/0426 |
| 2018/0136910 | A1* | 5/2018 | Noetzelmann | G05B 19/0426 |
| 2018/0150051 | A1* | 5/2018 | Kobayashi | B25J 9/1697 |
| 2019/0018385 | A1* | 1/2019 | Soneda | G05B 19/05 |
| 2019/0025783 | A1* | 1/2019 | Tamashima | G05B 19/0423 |
| 2019/0079485 | A1* | 3/2019 | Hamaguchi | G05B 9/03 |
| 2019/0204792 | A1* | 7/2019 | Kanaya | G05B 19/0425 |
| 2019/0361418 | A1* | 11/2019 | Miyake | G05B 19/058 |
| 2020/0125061 | A1* | 4/2020 | Miyasaka | G05B 19/058 |
| 2020/0159202 | A1* | 5/2020 | Fujieda | G05B 19/4183 |
| 2020/0277847 | A1* | 9/2020 | Rojas | H04L 63/029 |
| 2020/0278662 | A1* | 9/2020 | Hashimoto | G05B 19/4186 |
| 2022/0382663 | A1* | 12/2022 | Ellam | G06F 11/3476 |
| 2023/0152771 | A1* | 5/2023 | Wakahara | H04N 5/76 |
| | | | | 700/18 |

FOREIGN PATENT DOCUMENTS

| | | |
|---|---|---|
| JP | 2020-067751 A | 4/2020 |
| WO | 2012/056539 A1 | 5/2012 |

OTHER PUBLICATIONS

Notice of Reasons for Refusal mailed on Oct. 12, 2021, received for JP Application 2021-540826, 8 pages including English Translation.
Office Action issued Aug. 23, 2025 in Chinese Patent Application No. 202180088757.9, 15 pages.
Office Action issued Feb. 11, 2026 in Chinese Patent Application No. 202180088757.9, 12 pages.

* cited by examiner

| DEVICE NAME/ LABEL NAME | LOGGING TARGET? | TYPE | PROGRAM NAME | DATA NAME |
|---|---|---|---|---|
| d1 | ☐ | SENSOR | prg01 | (GLOBAL) |
| d2 | ☐ | SENSOR | prg01 | (GLOBAL) |
| d3 | ☑ | SENSOR | prg02 | SR01D |
| d4 | ☐ | ACTUATOR | prg01 | (GLOBAL) |
| MA01 | ☐ | ACTUATOR | prg03 | AC02D |

Include all the listed devices into logging targets

Exclude all the listed devices from logging targets

Designate display items

Determine logging targets

*FIG. 3*

| DEVICE NAME/ LABEL NAME | LOGGING TARGET? | TYPE | PROGRAM NAME | DATA NAME |
|---|---|---|---|---|
| | | SENSOR | prg01 | |
| d1 | ☐ | SENSOR | prg01 | (GLOBAL) |
| d2 | ☐ | SENSOR | prg01 | (GLOBAL) |
| MS02 | ☐ | SENSOR | prg01 | (GLOBAL) |
| d12 | ☑ | SENSOR | prg01 | SR04D |
| d23 | ☐ | SENSOR | prg01 | SR07D |

Include all the listed devices into logging targets

Exclude all the listed devices from logging targets

Designate display items

Determine logging targets

*FIG. 4*

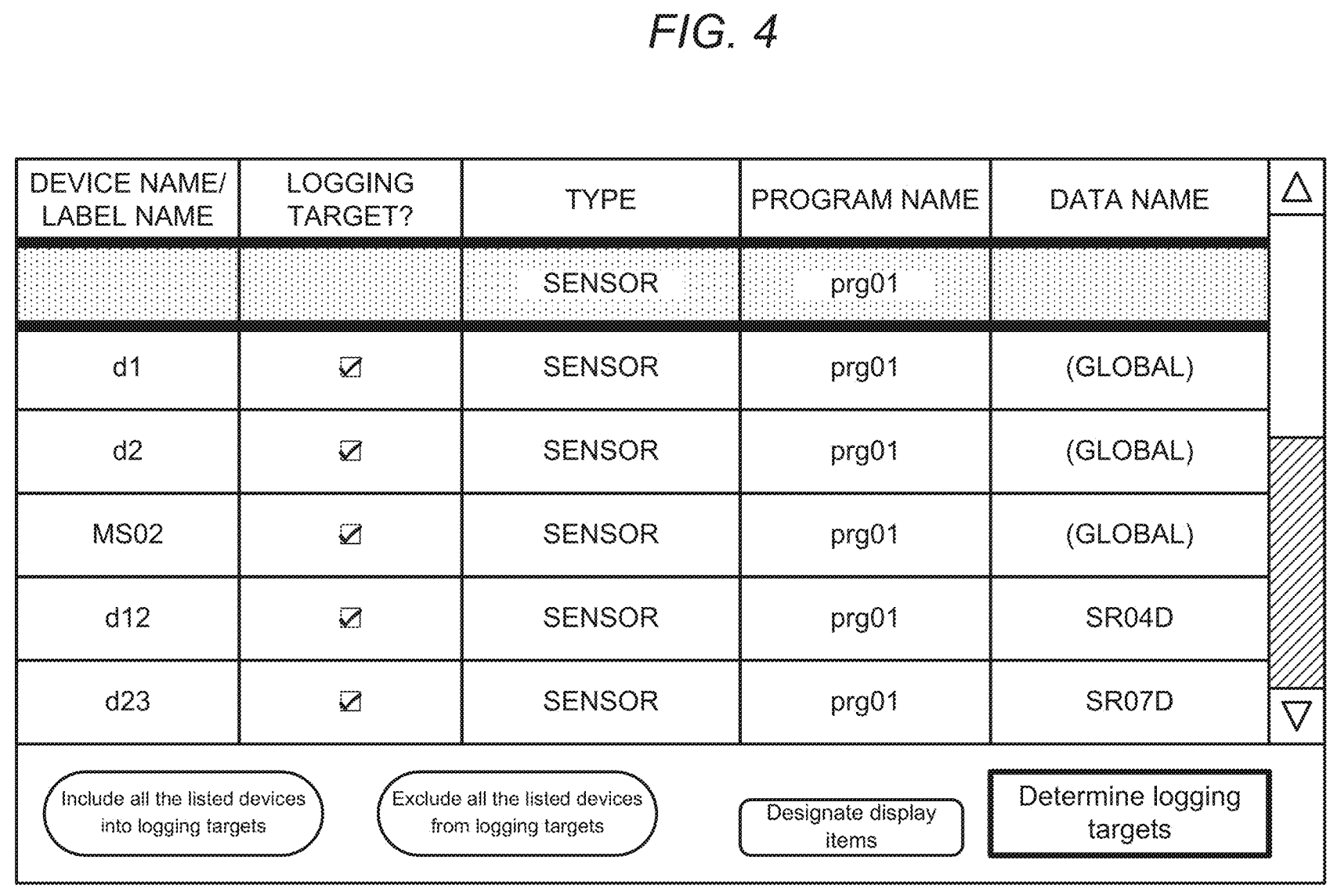

| DEVICE NAME/ LABEL NAME | LOGGING TARGET? | TYPE | PROGRAM NAME | DATA NAME |
|---|---|---|---|---|
|  |  | SENSOR | prg01 |  |
| d1 | ☑ | SENSOR | prg01 | (GLOBAL) |
| d2 | ☑ | SENSOR | prg01 | (GLOBAL) |
| MS02 | ☑ | SENSOR | prg01 | (GLOBAL) |
| d12 | ☑ | SENSOR | prg01 | SR04D |
| d23 | ☑ | SENSOR | prg01 | SR07D |

Include all the listed devices into logging targets

Exclude all the listed devices from logging targets

Designate display items

Determine logging targets

LOGGING SUPPORT APPARATUS, LOGGING SYSTEM, METHOD FOR LOGGING SUPPORT, AND RECORDING MEDIUM

CROSS-REFERENCE TO RELATED APPLICATION

The present application is based on PCT filing PCT/JP2021/002070, filed Jan. 21, 2021, the entire contents of which are incorporated herein by reference.

TECHNICAL FIELD

The present disclosure relates to a logging support apparatus, a logging system, a method for logging support, and a program.

BACKGROUND ART

In a control system including a programmable logic controller (hereinafter referred to as "PLC"), the PLC is sometimes required to record logs of devices for purposes, such as functional improvement and troubleshooting. The recording of logs is also called "logging". The "device" in the field of PLC means a memory area used in a program executed in the PLC. The device indicates a signal received from a sensor, a signal output to an actuator, an internal state, and a timer, for example.

Since the control system including the PLC requires high levels of realtimeness and constant periodicity, the PLC is preferably subject to a low processing load. The control system, however, may fail to satisfy the requirements for realtimeness and constant periodicity due to a high processing load of logging, when the logging is directed to a large number of devices, which may reach about several hundred thousands. This problem needs limitation of the devices to be determined as logging targets.

Furthermore, the control system including the PLC is typically used by a user for several decades, and supposed to suffer from a lack of a storage capacity for logs. The devices determined as logging targets should thus be limited also in terms of the storage capacity for logs.

As a technique related to the above situations, Patent Literature 1 discloses analysis of a user program executed in a PLC and extraction of devices as logging targets.

CITATION LIST

Patent Literature

Patent Literature 1: Unexamined Japanese Patent Application Publication No. 2020-67751

SUMMARY OF INVENTION

Technical Problem

Unfortunately, in the technique disclosed in Patent Literature 1, the devices are automatically determined as logging targets on the basis of the content of the user program, and the user is not allowed to arbitrarily designate devices as logging targets.

In order to allow the user to arbitrarily designate devices as logging targets, another technique is demanded for facilitating the user to efficiently designate devices as logging targets from a large number of devices, which may reach about several hundred thousands.

An objective of the present disclosure, which has been accomplished in view of the above situations, is to provide a logging support apparatus and the like that allow a user to efficiently and arbitrarily designate devices as logging targets.

Solution to Problem

In order to achieve the above objective, a logging support apparatus according to an aspect of the present disclosure includes: device enumeration means for analyzing a project file for a control system including a programmable logic controller, and enumerating at least one device related to the control system; display control means for causing a list of the at least one device enumerated by the device enumeration means to be displayed on display means; device designation means for designating a device to be included into a logging target among the at least one device displayed on the display means, in accordance with an operation of a user; and target data generation means for generating target data indicating the device designated by the device designation means to be included into the logging target.

Advantageous Effects of Invention

The present disclosure can allow a user to efficiently and arbitrarily designate devices as logging targets.

BRIEF DESCRIPTION OF DRAWINGS

FIG. 1 illustrates an entire configuration of a logging system according to an embodiment of the present disclosure;

FIG. 2 illustrates an exemplary registration screen displayed in a logging support apparatus according to the embodiment of the present disclosure;

FIG. 3 illustrates another exemplary registration screen displayed in the logging support apparatus according to the embodiment of the present disclosure;

FIG. 4 illustrates another exemplary registration screen displayed in the logging support apparatus according to the embodiment of the present disclosure;

FIG. 5 illustrates a functional configuration of the logging support apparatus according to the embodiment of the present disclosure;

FIG. 7 illustrates an exemplary hardware configuration of a logging support apparatus according to Embodiment 1 of the present disclosure.

DESCRIPTION OF EMBODIMENTS

Figure 6:
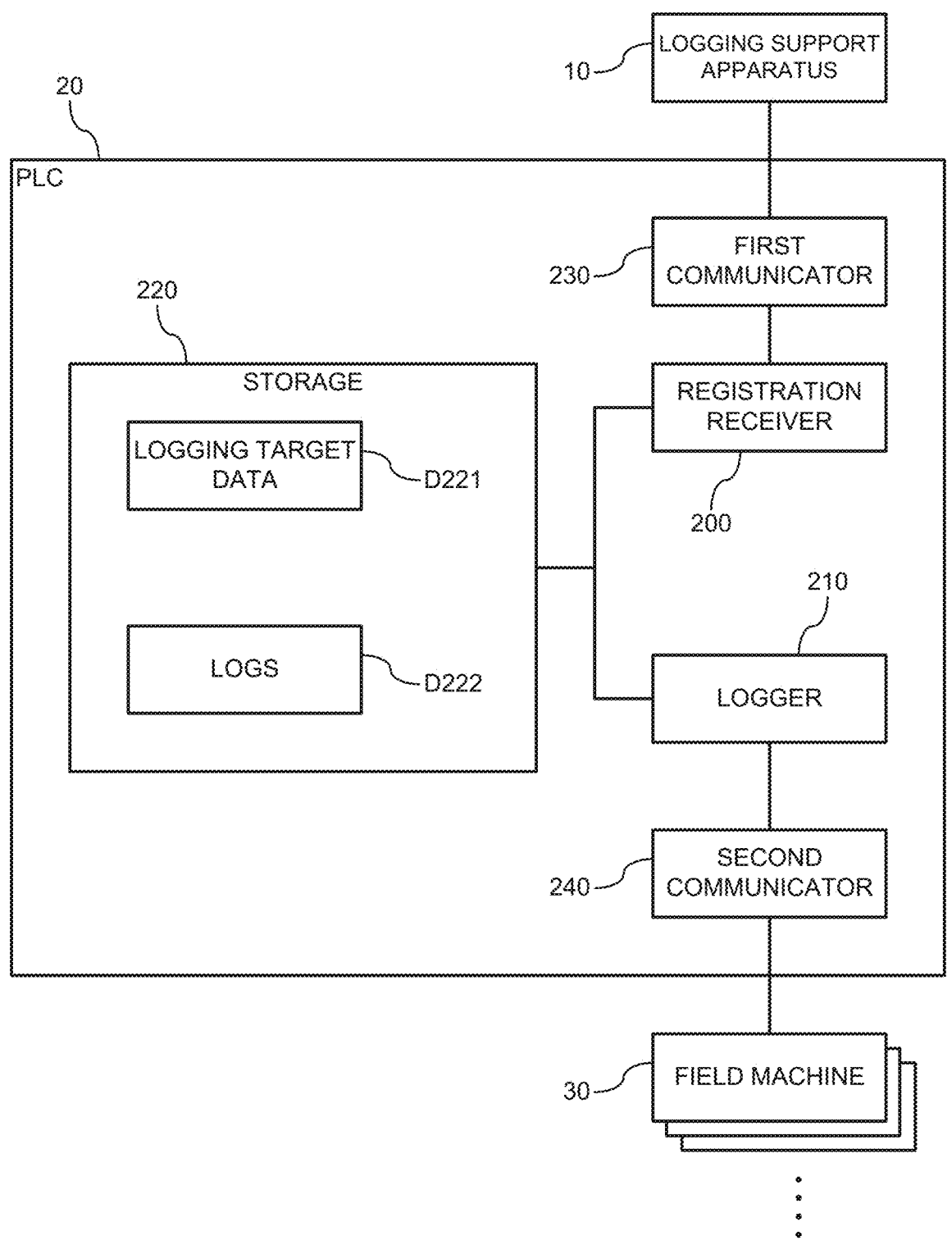
FIG. 6 illustrates a functional configuration of a programmable logic controller according to the embodiment of the present disclosure.

A logging system according to an embodiment of the present disclosure is described below with reference to the accompanying drawings. In each of the drawings, the components identical or corresponding to each other are provided with the same reference symbol.

Embodiment

Figure 1:
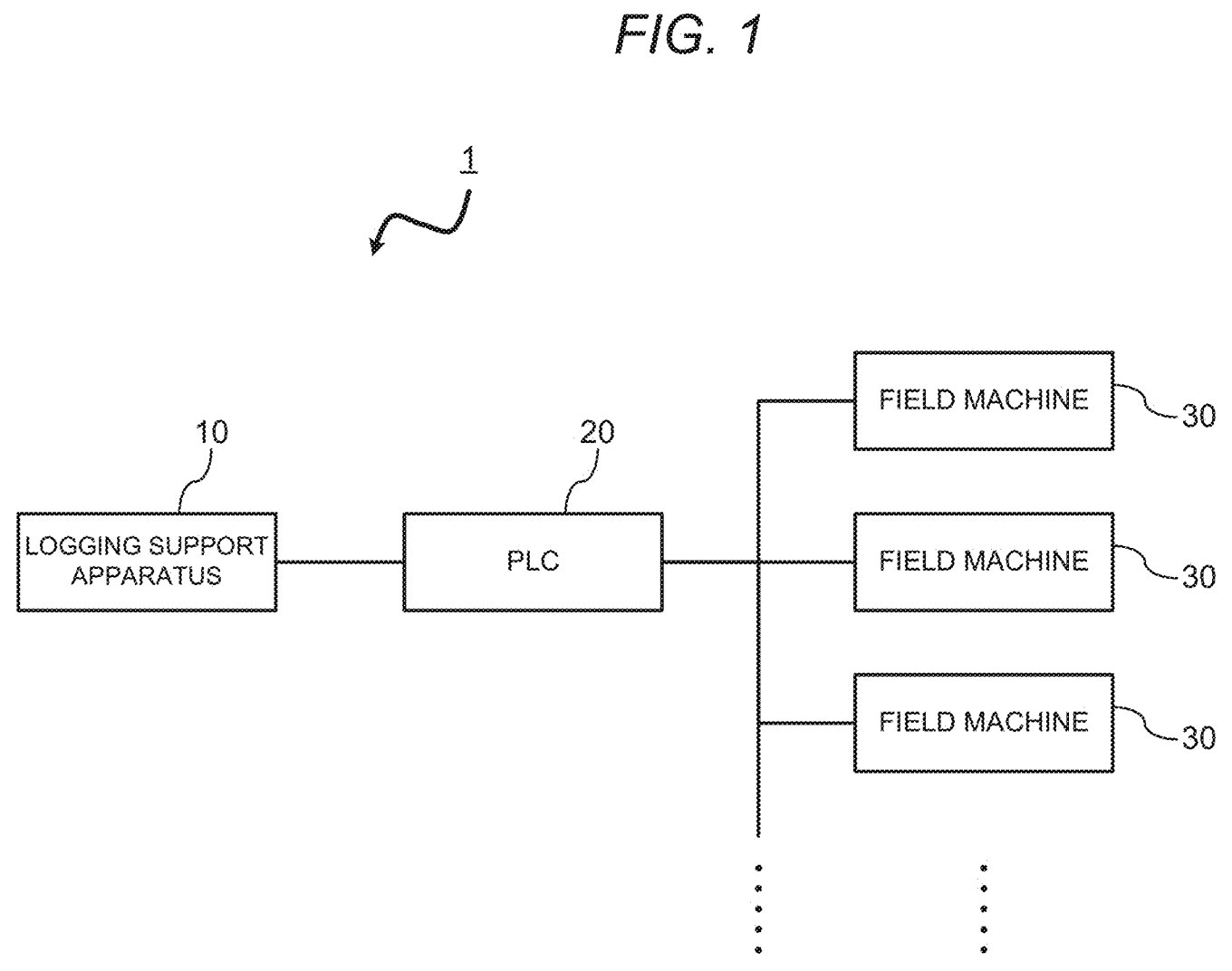

A logging system 1 according to an embodiment is described below with reference to FIG. 1. The logging system 1 includes a logging support apparatus 10, a PLC 20, and one or more field machines 30. In the logging system 1, the PLC 20 records logs of devices. The PLC 20 records the logs of devices registered by the logging support apparatus 10, as is described in detail below. The logging system 1 is an exemplary logging system according to the present disclosure.

The PLC 20 is a programmable logic controller connected to each of the field machines 30 such that the PLC 20 can communicate with the field machine 30. The field machines 30 include sensors serving as inputting machines and actuators serving as outputting machines, for example. The field machines 30 cooperate with each other in accordance with the program executed in the PLC 20 and thereby achieve a control system. A typical example of the control system is a product manufacturing system operating in a factory.

The PLC 20 is able to record logs of devices related to the control system. In an exemplary case where the field machines 30 include a pressure sensor, the PLC 20 can record a log of a device indicating the pressure value detected at the pressure sensor. In another exemplary case, the PLC 20 can record a log of a device indicating an intermediate state used only inside the PLC 20. The PLC 20 is also connected to the logging support apparatus 10 such that the PLC 20 can communicate with the logging support apparatus 10. The PLC 20 records logs of devices registered as logging targets by the logging support apparatus 10. The PLC 20 is an exemplary programmable logic controller according to the present disclosure. The PLC 20 has a functional configuration described below.

The logging support apparatus 10 causes devices determined as logging targets at the PLC 20 to be registered into the PLC 20. The logging support apparatus allows a user to efficiently and arbitrarily designate devices as logging targets, as is described in detail below. The logging support apparatus 10 is an exemplary logging support apparatus according to the present disclosure. The logging support apparatus 10 has a functional configuration described below.

The logging support apparatus 10 is a personal computer for activating a program of an engineering tool, for example. The engineering tool is used for parameter setting and generation of programs related to the control system including the PLC 20 and the field machines 30, for example. In this embodiment, the engineering tool has not only the functions for program generation and parameter setting but also functions for registration of logging targets.

A user first uses the logging support apparatus 10 to perform the functions of the engineering tool for program generation and parameter setting, and thereby generates a project file for the control system. The project file is a collection of programs for operations of the PLC 20 and setting data for operations of the PLC 20. The user then uses the logging support apparatus 10 to perform the functions of the engineering tool for registration of logging targets, and thereby registers devices determined as logging targets into the PLC 20.

A summary of the registration of logging targets executed in the logging support apparatus 10 is described below with reference to exemplary screens illustrated in FIGS. 2, 3, and 4.

When the user starts to register logging targets by means of the logging support apparatus 10, the screen like that illustrated in FIG. 2 shows a list of devices. This screen is a graphical user interface (GUI) and allows the user to execute operations on the screen using an input device, such as mouse or touch pad. The character strings contained in the column "device name/label name" in FIG. 2 are identifiers for identifying the individual devices. The "device name" is an identifier that the program of the engineering tool automatically assigned to each of the devices during generation of a project file, for example. The "label name" is an identifier that the user spontaneously assigned to some devices during generation of a project file, for example. In this case, the "label name" is preferentially presented on the screen illustrated in FIG. 2 for the devices provided with the "label name". This preferential display of the "label name" facilitates the user to identify the individual devices. For example, the names including d1 and d2 are applicable to the "device name", while MA01 is applicable to the "label name" in the screen illustrated in FIG. 2.

The user can enter conditions in the dot-hatched row in the screen illustrated in FIG. 2, as is described in detail below. No condition is entered in the screen illustrated in FIG. 2. The checkbox in the column "logging target?" is checked only regarding the device provided with a device name d3 in the screen illustrated in FIG. 2. This status indicates that the device provided with a device name d3 is being registered as a logging target at the current time. Although five devices are currently displayed on the screen, the user can view other devices out of the screen by moving the scroll bar on the right.

The screen illustrated in FIG. 2, when the user enters the conditions that the "type" is a "sensor" and the "program name" is "prg01", is turned into the screen illustrated in FIG. 3. The screen thus contains only the devices of which the "type" is a "sensor" and the "program name" is "prg01". The screen illustrated in FIG. 3, when the user executes an operation of selecting the button indicating "include all the listed devices into logging targets", is turned into the screen illustrated in FIG. 4, in which the checkboxes in the column "logging target?" are checked regarding all the devices. The screen illustrated in FIG. 3 is also turned into the screen illustrated in FIG. 4 when the user executes an operation of checking the checkboxes in the column "logging target?" regarding the individual devices.

When the user executes an operation of selecting the button indicating "exclude all the listed devices from logging targets" on the screen illustrated in FIG. 3, the user can exclude the device provided with a device name d12, which has already been designated as a logging target in the screen illustrated in FIG. 3. The user can also exclude the device provided with a device name d12 from the logging targets by unchecking the checkbox in the column "logging target?" regarding this device.

When the user determines that no more devices must be included or excluded into or from the logging targets, the user executes an operation of selecting the button indicating "determine logging targets" on the screen illustrated in FIG. 4, and can thereby cause all the devices designated as logging targets to be registered into the PLC as logging targets. In contrast, when the user determines that another device must be included or excluded into or from logging targets, the user can continue the above-described operations for designation of conditions and inclusion/exclusion of logging targets.

By means of a combination of the above-described operations, the user can arbitrarily and efficiently designate devices as logging targets.

The user can change the display items in the individual columns illustrated in FIGS. 2, 3, and 4 through an operation of selecting the button indicating "designate display items". For example, the user can hide the item "data name", and instead show the item "comment", which indicates comments that the user added to a device during generation of a project. In this case, the user can designate a condition using a character string, such as "environmental temperature", "operating voltage", or "internal state", contained in some comments. The display of comments facilitates the user to readily determine which device the user should designate as logging targets, and the designation of a condition using a comment allows the user to narrow down the logging targets.

Figure 5:
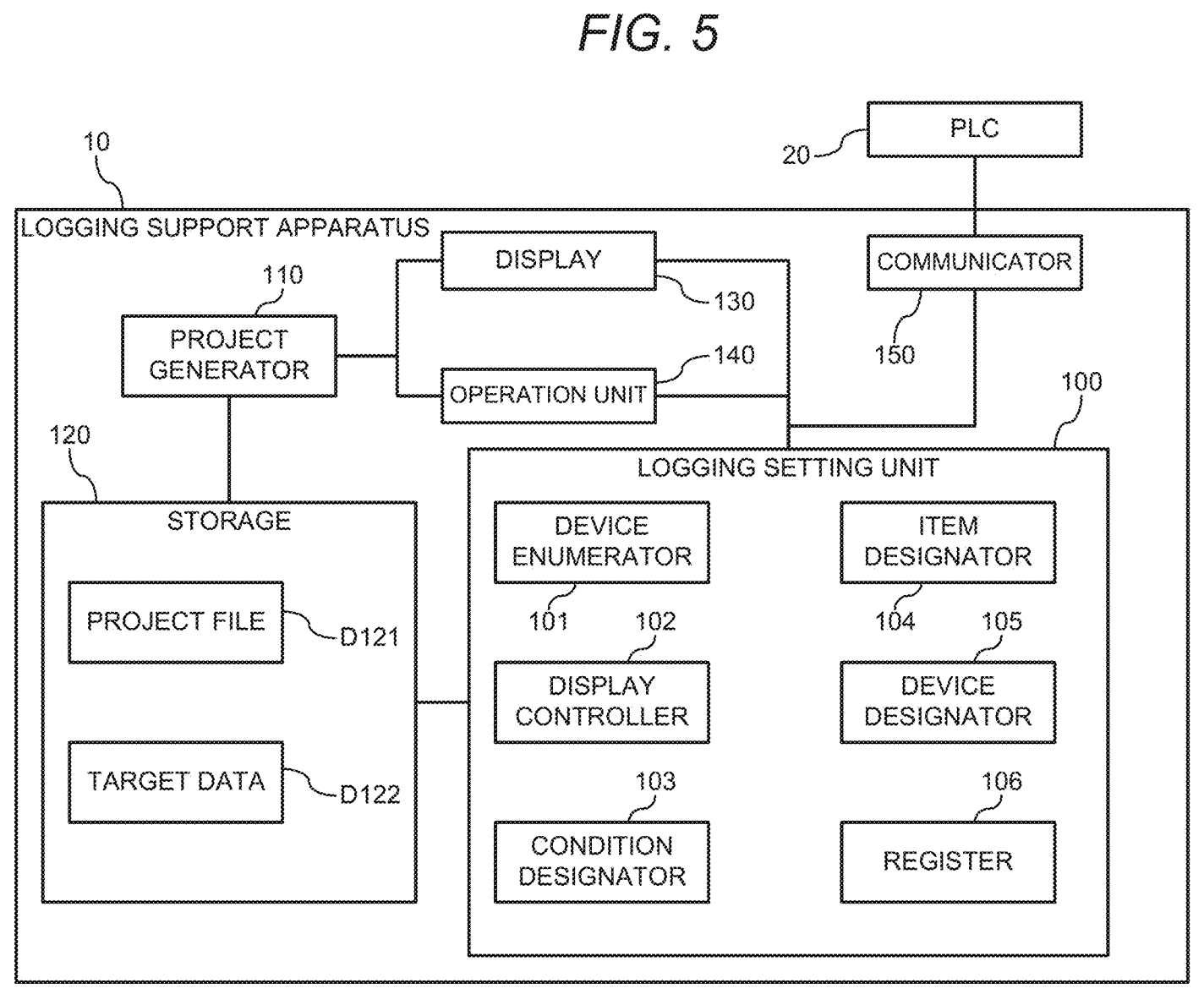

The following description is directed to a functional configuration of the logging support apparatus 10 with reference to FIG. 5. The logging support apparatus includes a logging setting unit 100, a project generator 110, a storage 120, a display 130, an operation unit 140, and a communicator 150.

The display 130 displays information to be presented to the user. A typical example of the display 130 is a liquid crystal display. The display 130 displays a screen for generation of a project file and a screen for designation of devices as logging targets, for example. The display 130 is exemplary display means according to the present disclosure.

The operation unit 140 outputs a signal based on an operation of the user. A typical example of the operation unit 140 is an input device, such as keyboard, mouse, or touch pad.

The storage 120 stores a project file D121 and target data D122. The project file D121 and the target data D122 are described in detail below. The project file D121 is an exemplary project file according to the present disclosure.

The project generator 110 causes a screen for generation of the project file D121 to be displayed on the display 130, and causes the project file D121 to be stored into the storage 120 in accordance with a signal based on an operation of the user and output from the operation unit 140.

The logging setting unit 100 has functions for registration of devices as logging targets. The logging setting unit 100 includes a device enumerator 101, a display controller 102, a condition designator 103, an item designator 104, a device designator 105, and a register 106.

The device enumerator 101 analyzes the project file D121 stored in the storage 120, and enumerates devices related to the control system. The device enumerator 101 is exemplary device enumeration means according to the present disclosure.

The display controller 102 controls the display 130, and causes a list of the devices enumerated by the device enumerator 101 to be displayed on the display 130. The display 130 accordingly displays the screen illustrated in FIG. 2, for example. When the condition designator 103 (described below) designates conditions, the display controller 102 causes a list of the devices that satisfy the conditions to be displayed on the display 130. The display 130 accordingly displays the screen illustrated in FIG. 3, for example. When the item designator 104 (described below) designates display items, the display controller 102 causes a list of devices to be displayed on the display 130 such that the contents corresponding the display items appear regarding the devices. The display controller 102 is exemplary display control means according to the present disclosure.

The condition designator 103 designates conditions for the devices to be displayed on the display 130 among the devices, in accordance with a signal based on an operation of the user and output from the operation unit 140. For example, on the screen illustrated in FIG. 2, when the user enters conditions into the dot-hatched row like those illustrated in FIG. 3, the condition designator 103 designates these conditions for the devices to be displayed on the display 130. The condition designator 103 is exemplary condition designation means according to the present disclosure.

The item designator 104 designates display items to appear in the list of devices, in accordance with a signal based on an operation of the user and output from the operation unit 140. The item designator 104 is exemplary item designation means according to the present disclosure.

The device designator 105 designates devices to be included into the logging targets and devices to be excluded from the logging targets, among the devices caused by the display controller 102 to be displayed on the display 130, in accordance with a signal based on an operation of the user and output from the operation unit 140. For example, when the user checks the checkboxes in the column "logging target?" or selects the button indicating "include all the listed devices into logging targets" on the screen illustrated in FIG. 3, the device designator 105 designates these devices to be included into the logging targets. Also, when the user unchecks the checkboxes in the column "logging target?" or selects the button indicating "exclude all the listed devices from logging targets" on the screen illustrated in FIG. 4, the device designator 105 designates these devices to be excluded from the logging targets, for example. The device designator 105 then causes the target data D122 indicating the devices designated as logging targets to be stored into the storage 120. The device designator 105 is exemplary device designation means and target data generation means according to the present disclosure.

The register 106 refers to the target data D122 stored in the storage 120 and causes the devices determined as logging targets to be registered into the PLC 20. Specifically, the register 106 transmits information indicating the devices determined as logging targets to the PLC 20 via the communicator 150 (described below), and thereby causes the devices determined as logging targets to be registered into the PLC 20.

The communicator 150 communicates with the PLC 20. The communicator 150 is achieved by a network interface, for example. In particular, the communicator 150 transmits information indicating the devices determined as logging targets to the PLC 20.

The following description is directed to a functional configuration of the PLC 20 with reference to FIG. 6. The PLC 20 includes a registration receiver 200, a logger 210, a storage 220, a first communicator 230, and a second communicator 240. The PLC 20 also has general functions of a programmable logic controller as well as the above-listed functions.

The first communicator 230 communicates with the logging support apparatus 10. The first communicator 230 is achieved by a network interface, for example. In particular, the first communicator 230 receives the information indicating the devices determined as logging targets from the logging support apparatus 10.

The second communicator 240 communicates with each of the field machines 30. The second communicator 240 is achieved by an input/output unit of the PLC, for example. On the basis of information acquired through communication via the second communicator 240, the logger 210 (described below) records logs of devices related to the field machines 30.

The storage 220 stores logging target data D221 and logs D222. The logging target data D221 indicates devices determined as logging targets. The logs D222 are logs of the devices determined as logging targets. The storage 220 is exemplary storage means according to the present disclosure.

The registration receiver 200 receives registration of devices as logging targets executed at the register 106 of the logging support apparatus 10. Specifically, the registration receiver 200 receives the information indicating the devices determined as logging targets from the logging support apparatus 10 via the first communicator 230, generates logging target data D221 indicating the devices determined as logging targets, and causes the logging target data D221 to be stored into the storage 220. The registration receiver 200 is exemplary registration receiving means according to the present disclosure.

The logger 210 refers to the logging target data D221 stored in the storage 120, and causes logs of the devices determined as logging targets to be recorded into the storage 120 in the form of logs D222. The logger 210 is exemplary logging means according to the present disclosure.

Figure 7:
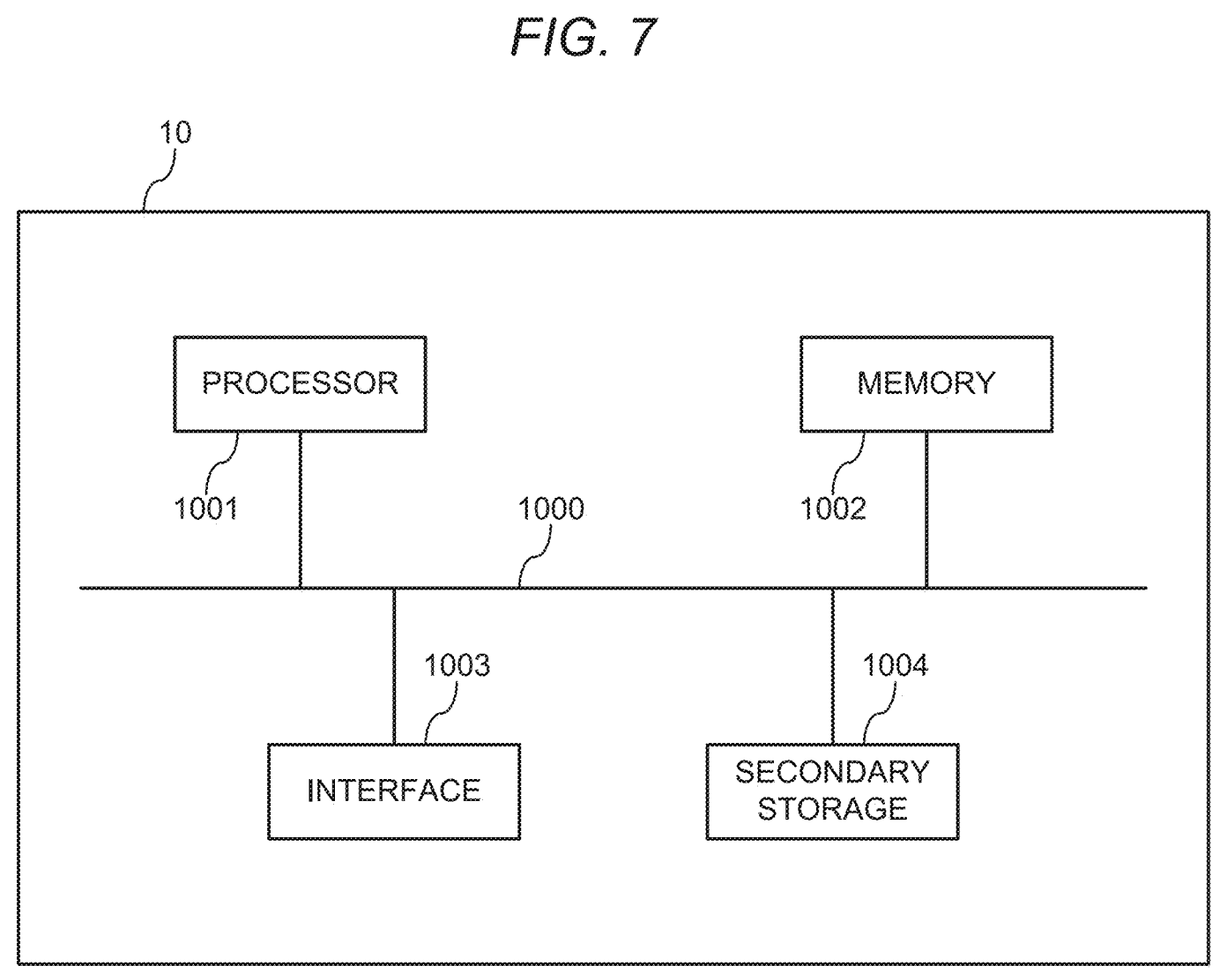

The logging support apparatus 10 has an exemplary hardware configuration described below with reference to FIG. 7. The logging support apparatus 10 illustrated in FIG. 7 is achieved by a computer, such as personal computer, smartphone, or tablet, for example. When the program of the engineering tool is installed into such a computer and executed in the computer, the computer performs the individual functions of the logging support apparatus 10.

The logging support apparatus 10 includes a processor 1001, a memory 1002, an interface 1003, and a secondary storage 1004, which are connected to each other via buses 1000.

The processor 1001 is a central processing unit (CPU), for example. The processor 1001 loads the program of the engineering tool stored in the secondary storage 1004 into the memory 1002 and executes the program, and thereby performs the individual functions of the logging support apparatus 10.

The memory 1002 is a main storage including a random access memory (RAM), for example. The memory 1002 stores the program of the engineering tool that the processor 1001 loads from the secondary storage 1004. The memory 1002 serves as a working memory when the processor 1001 executes an operational program.

The interface 1003 is an input/output (I/O) interface, such as serial port, universal serial bus (USB) port, or network interface, for example. The interface 1003 achieves functions of the communicator 150. For example, the interface 1003 is connected to a liquid crystal display to perform functions of the display 130, and the interface 1003 is connected to an input device, such as mouse, keyboard, or touch panel to perform functions of the operation unit 140.

The secondary storage 1004 is a flash memory, a hard disk drive (HDD), or a solid state drive (SSD), for example. The secondary storage 1004 stores the program of the engineering tool to be executed at the processor 1001. The secondary storage 1004 performs functions of the storage 120.

Figure 8:
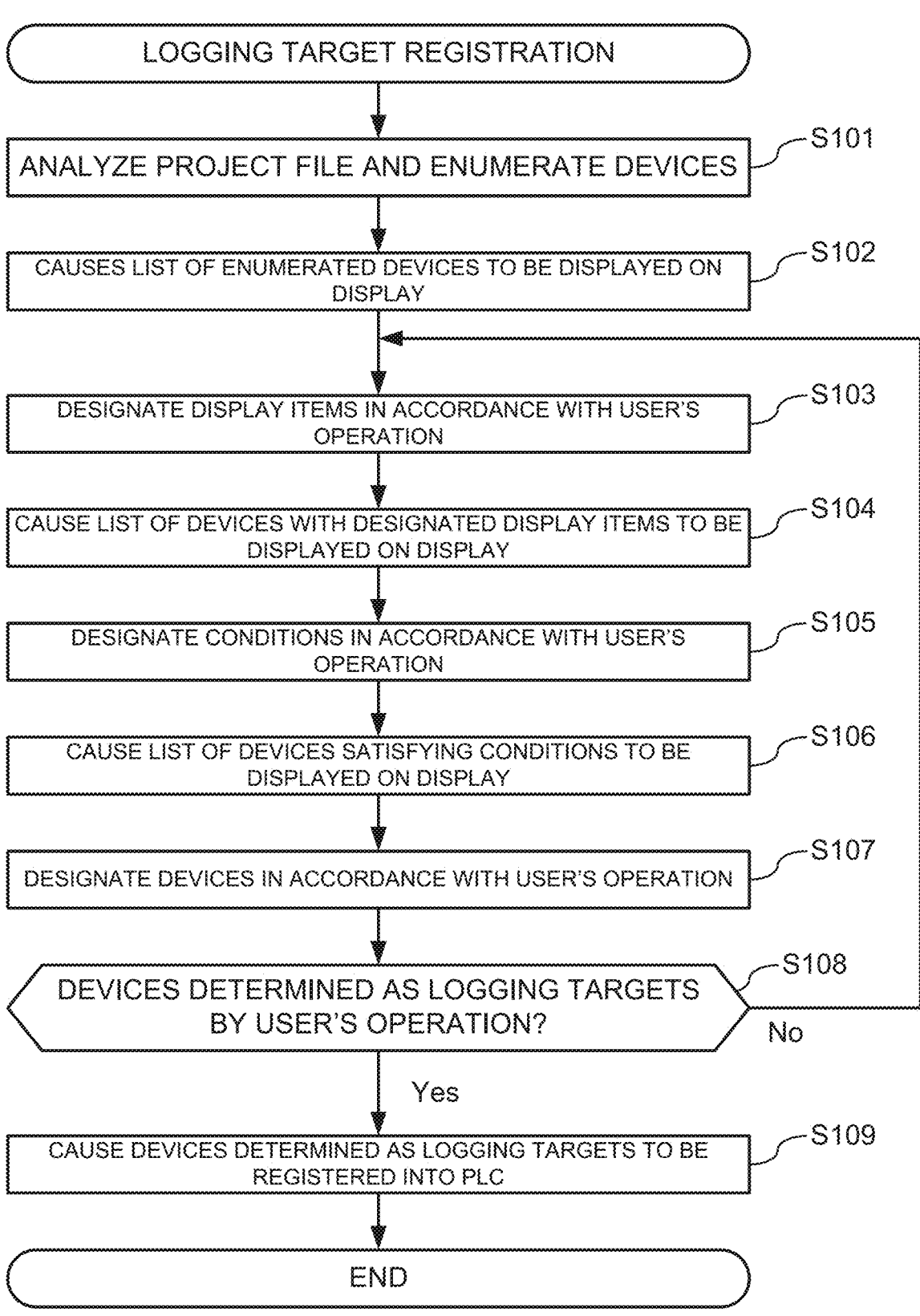
FIG. 8 is a flowchart illustrating an exemplary process for registration of logging targets executed in the logging support apparatus according to Embodiment 1 of the present disclosure.

The logging support apparatus 10 executes an exemplary process for registration of logging targets, as is described below with reference to FIG. 8. The process illustrated in FIG. 8 is started, for example, at a timing when the user executes the program of the engineering tool in the logging support apparatus 10 and invokes the functions for registration of logging targets among the functions of the engineering tool.

The device enumerator 101 of the logging setting unit 100 of the logging support apparatus 10 analyzes the project file D121 stored in the storage 120, and enumerates devices related to the control system (Step S101).

The display controller 102 of the logging setting unit 100 causes a list of the devices enumerated in Step S101 to be displayed on the display 130 (Step S102). Steps S101 and S102 cause the screen illustrated in FIG. 2 to be displayed on the display 130, for example.

The item designator 104 of the logging setting unit 100 designates display items to appear in the list of devices, in accordance with an operation of the user (Step S103). The display controller 102 causes the list of devices with the display items designated in Step S103 to be displayed on the display 130 (Step S104).

The condition designator 103 of the logging setting unit 100 designates conditions for the devices to be displayed on the display 130, in accordance with an operation of the user (Step S105). The display controller 102 causes a list of the devices that are enumerated in Step S101 and satisfy the conditions designated in Step S105, to be displayed on the display 130 (Step S106). Steps S105 and S106 cause the screen illustrated in FIG. 3 to be displayed on the display 130, for example.

The device designator 105 of the logging setting unit 100 designates devices to be included into the logging targets and devices to be excluded from the logging targets, in accordance with an operation of the user (Step S107). The device designator 105 then causes the target data D122, which indicates the devices being designated as logging targets at the current time, to be stored into the storage 120.

The logging setting unit 100 determines whether the user executes an operation of determining devices as logging targets (Step S108). For example, the logging setting unit 100 determines whether the button indicating "determine logging targets" on the screens illustrated in FIGS. 2, 3, and 4 is selected in accordance with a signal from the operation unit 140, and thereby determines whether the user executes an operation of determining devices as the logging targets.

When the user does not execute an operation of determining devices as logging targets (Step S108: No), the logging setting unit 100 repeats Step S103 and the following steps.

In contrast, when the user executes an operation of determining devices as logging targets (Step S108: Yes), the register 106 of the logging setting unit 100 refers to the target data D122 stored in the storage 120, and causes the devices determined as logging targets to be registered into the PLC 20 (Step S109). The logging setting unit 100 then terminates the process for registration of logging targets.

Although FIG. 8 illustrates serial execution of Steps S103 to S108, these steps may also be executed in parallel as appropriate. For example, Steps S103 to S104 and Steps S105 to S106 may be executed in parallel to each other.

The logging system 1 according to the embodiment is configured as described above. The logging support apparatus 10 of the logging system 1 allows the user to designate conditions in a list of devices and narrow down the devices, and designate devices to be included into the logging targets and devices to be excluded from the logging targets. The logging support apparatus 10 therefore allows the user to efficiently and arbitrarily designate devices as logging targets.

Modification

In the embodiment, the PLC 20 causes the logging target data D221 and the logs D222 to be stored into the same storage 120. Alternatively, the PLC 20 may be connected to an external mass storage, and this external storage may store the logs D222 because the logs D222 can have an extremely large volume. The external storage may store not only the logs D222 but also the logging target data D221.

In some conceivable cases in the embodiment, the devices determined as logging targets may have device names d1, d2, d4, d6, d7, and d8, which are substantially serial numbers but contain "missing numbers". In such cases, it is more preferable to designate these devices as logging targets using the range of "d1 to d8" regardless of the "missing numbers" than using the original individual names "d1, d2, d4, d6, d7, and d8", in terms of process efficiency and in terms of the size of the logging target data D221, as is described below. In addition, some accessing methods of the hardware circuit of the PLC 20 prefer or require accesses in the unit of a certain number of bits or certain number of bytes, such as 64 or 256 bits, because these accesses can achieve higher efficiency. In this case, it may be more preferable to designate the devices using a broader range of "d0 to d15", for example, in terms of process efficiency.

For example, in the case of designation of the devices except for the "missing numbers" one by one, several accesses are required to the individual memory areas while skipping some areas. In contrast, in the case of designation of the devices using a range, a single access may cover the successive memory areas. It is therefore preferable, in some cases of several "missing numbers", to designate the devices as logging targets using a range regardless of "missing numbers" in terms of process efficiency.

Furthermore, the designation of devices as logging targets using the range of "d1 to d8" can achieve a smaller size of the logging target data D221, than the designation using the names "d1, d2, d4, d6, d7, and d8" except for the "missing numbers". In some conceivable cases, the PLC 20 may use the external storage to store the logs D222 as described above, but may have an extremely small capacity of the storage 120 for storing the logging target data D221. The logging target data D221 thus needs to have a smaller size in such cases, and prefers the designation using a range to the designation using names except for "missing numbers".

When the target data D122 stored in the storage 120 of the logging support apparatus 10 contains "missing numbers", the register 106 of the logging support apparatus 10 may designate the devices as logging targets using a range, and cause the devices to be registered into the PLC 20, and can thereby solve the above-described problem. Alternatively, when the data indicating devices determined as logging targets received at the registration receiver 200 of the PLC 20 contains "missing numbers", the registration receiver 200 may generate logging target data D221 indicating the devices determined as logging targets using a range, and can thereby solve the above-described problem. Alternatively, the problem may be solved by separate processes, such that the register 106 registers the devices using the minimum range in order to reduce the size of the logging target data D221, and the registration receiver 200 of the PLC 20 reextends the range depending on specifications of the hardware circuit of the PLC 20, for example.

In some conceivable cases in the embodiment, the project file D121 may be changed after registration of the devices determined as logging targets by registration of additional devices, deletion of the registered devices, and adjustment of parameters, for example. In such cases, a requirement for the user to designate devices as logging targets all over again would impose a large burden on the user. In order to reduce this burden, the storage 120 may store condition data indicating the conditions designated by the condition designator 103 at the time of original designation of devices. In the case of a change in the project file D121, the device designator 105 may automatically designate the devices as logging targets on the basis of the stored conditions, without receiving an operation of the user. This automatic designation of devices as logging targets at the device designator 105 can reduce the burden of designating operations on the user. The storage 120 in this case is exemplary condition storage means according to the present disclosure.

In the embodiment, the logging support apparatus 10 uses the register 106 to cause the devices determined as logging targets to be registered into the PLC 20. The logging support apparatus 10, however, does not have to include the register 106, provided that the logging support apparatus 10 can generate information indicating the devices determined as logging targets. For example, the logging support apparatus 10 can cause the devices determined as logging targets to be registered into the PLC 20 without the register 106, by storing the target data D122 generated in the logging support apparatus 10 into a removable medium, such as USB flash drive or memory card, and connecting this removable medium to the PLC 20.

Although the logging support apparatus 10 includes the secondary storage 1004 in the hardware configuration illustrated in FIG. 7, this configuration is a mere example. The secondary storage 1004 may be provided outside the logging support apparatus 10, and connected to the logging support apparatus 10 via the interface 1003. The secondary storage 1004 in this modification may be a removable medium, such as USB flash drive or memory card.

The hardware configuration of the logging support apparatus 10 illustrated in FIG. 7 may be replaced with a dedicated circuit including an application specific integrated circuit (ASIC) or a field programmable gate array (FPGA), for example. In the hardware configuration illustrated in FIG. 7, some of the functions of the logging support apparatus 10 may be performed by a dedicated circuit connected to the interface 1003, for example.

The program used in the logging support apparatus 10 can be stored in a non-transitory computer-readable recording medium, such as compact disc read only memory (CD-ROM), digital versatile disc (DVD), USB flash drive, memory card, or HDD, to be distributed. When this program is installed in a specific or general purpose computer, the program can cause the computer to function as the logging support apparatus 10.

Alternatively, the program may be stored in a storage included in another server on the Internet and downloaded from the server to a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Logging system
10 Logging support apparatus
20 PLC
30 Field machine

100 Logging setting unit
101 Device enumerator
102 Display controller
103 Condition designator
104 Item designator
105 Device designator
106 Register
110 Project generator
120 Storage
130 Display
140 Operation unit
150 Communicator
200 Registration receiver
210 Logger
220 Storage
230 First communicator
240 Second communicator
1000 Bus
1001 Processor
1002 Memory
1003 Interface
1004 Secondary storage
D121 Project file
D122 Target data
D221 Logging target data
D222 Log

The invention claimed is:

1. A logging system comprising:

a logging support apparatus including:

first circuitry to function as a device enumerator to analyze a protect file for a control system including a programmable logic controller, and enumerate at least one device related to the control system, a condition designator to designate a condition for a device to be displayed on a display among the at least one device related to the control system, in accordance with a character string entered by a user, a display controller to cause a list of the at least one device to be displayed on the display, the at least one device being enumerated by the device enumerator and satisfying the condition designated by the condition designator, a device designator to designate a device to be included into a logging target among the at least one device displayed on the display, in accordance with an operation of the user, and a target data generator to generate target data indicating the device designated by the device designator to be included into the logging target, the logging system further comprising the prograrinnable logic controller, wherein the programmable logic controller comprises second circuitry to function as:

a target data acquirer to acquire the target data generated by the target data generator of the logging support apparatus, and a logger to cause a log of the device to be recorded into a log storage, the device being indicated as the logging target by the target data, wherein the second circuitry of the programmable logic controller is further configured to store the acquired target data as logging target data and to store the log of the device in a separate logs storage area.

2. The logging system according to claim 1, wherein:

the first circuitry further functions as an item designator to designate a display item to appear in the list of the at least one device displayed on the display, in accordance with an operation of the user.

3. The logging system according to claim 1, further comprising:

a condition storage to store condition data indicating the condition designated by the condition designator, wherein when the project file is subject to change, the device designator automatically designates a device to be included into the logging target, on basis of the condition indicated by the condition data stored in the condition storage.

4. The logging system according to claim 1, wherein:

the device designator designates all of the at least one device displayed on the display to be included into the logging target, in accordance with an operation of the user.

5. The logging system according to claim 1, wherein:

the device designator further designates a device to be excluded from the logging target among the at least one device displayed on the display, in accordance with an operation of the user, and the target data generator generates target data indicating a device designated by the device designator to be included into the logging target and not designated by the device designator to be excluded from the logging target.

6. The logging system according to claim 5, wherein:

the device designator designates all of the at least one device displayed on the display to be excluded from the logging target, in accordance with an operation of the user.

7. A method for logging support, the method comprising:

analyzing a project file for a control system including a programmable logic controller, and enumerating at least one device related to the control system;

designating a condition for a device to be displayed on a display among the at least one device related to the control system, in accordance with a character string entered by a user;

causing a list of the at least one enumerated device to be displayed on the display, the at least one enumerated device satisfying the designated condition;

designating a device displayed on the display as a logging target, in accordance with an operation of the user;

causing the device designated as the logging target to be registered into the programmable logic controller, wherein the causing the device designated as the logging target to be registered into the programmable logic controller includes:

generating target data indicating the device designated to be included into the logging target;

acquiring, by the programmable logic controller, the target data;

causing, by the programmable logic controller, a log of the device to be recorded into a log storage, the device being indicated as the logging target by the target data; and storing, by the programmable logic controller, the acquired target data as logging target data and storing the log of the device in a separate logs storage area.

8. A non-transitory recording medium storing a program, the program causing a logging system to function as:

a device enumerator to analyze a project file for a control system including a programmable logic controller, and enumerate at least one device related to the control system;

a condition designator to designate a condition for a device to be displayed on a display among the at least one device related to the control system, in accordance with a character string entered by a user;

a display controller to cause a list of the at least one device to be displayed on the display, the at least one device being enumerated by the device enumerator and satisfying the condition designated by the condition designator;

a device designator to designate a device to be included into a logging target among the at least one device displayed on the display, in accordance with an operation of the user;

a target data generator to generate target data indicating the device designated by the device designator to be included into the logging target; and a logger to cause a log of the device to be recorded into a log storage, the device being indicated as the logging target by the target data, wherein the target data acquirer stores the acquired target data as logging target data and the logger stores the log of the device in a separate logs storage area.

9. The logging system of claim 1, wherein:
the condition designated by the condition designator is a requirement that a property of a device contains the character string entered by the user.

10. The logging system of claim 9, wherein:
the property is a user-added comment.

11. The logging system of claim 1, wherein:
the list of the at least one device is displayed in a table comprising a plurality of columns, and each column corresponds to a display item of the at least one device.

12. The logging system of claim 11, wherein:
the display items include at least two items selected from the group consisting of a device name, a label name, a device type, and a program name.

13. The logging system of claim 1, wherein:
the list includes a selectable checkbox corresponding to each of the at least one device, and the operation of the user to designate the device to be included into the logging target comprises selecting the checkbox.

14. The logging system of claim 1, wherein:
the device designator, in response to a single user operation selecting an include-all control displayed on the display, designates all devices in the list to be included into the logging target.

15. The logging system of claim 5, wherein:
the device designator, in response to a single user operation selecting an exclude-all control displayed on the display, designates all devices in the list to be excluded from the logging target.

16. The method of claim 7, wherein:
the designated condition is a requirement that a property of a device contains the character string entered by the user.

17. The method of claim 16, wherein:
the property is a user-added comment.

18. The non-transitory recording medium of claim 8, wherein:
the condition designated by the condition designator is a requirement that a property of a device contains the character string entered by the user.

* * * * *